United States Patent [19]
Hale

[11] Patent Number: 6,017,484
[45] Date of Patent: Jan. 25, 2000

[54] METHOD FOR MANUFACTURE OF MINIMUM POROSITY, WRINKLE FREE COMPOSITE PARTS

[75] Inventor: Harold P. Hale, 3358 Hill Dr., Duluth, Ga. 30136

[73] Assignee: Harold P. Hale, Duluth, Ga.

[21] Appl. No.: 08/786,784

[22] Filed: Jan. 21, 1997

[51] Int. Cl.[7] .................................................. B29C 70/46
[52] U.S. Cl. ........................... 264/510; 156/286; 264/102; 264/257; 264/258; 264/571
[58] Field of Search .................... 264/102, 258, 264/510, 257, 571, DIG. 78; 156/286

[56] References Cited

U.S. PATENT DOCUMENTS

| | | | |
|---|---|---|---|
| H565 | 1/1989 | Ford et al. | 264/102 |
| 2,977,269 | 3/1961 | Nerwick | 264/102 |
| 3,837,965 | 9/1974 | Mahon | 156/382 |
| 3,975,479 | 8/1976 | McClean | 264/102 |
| 4,007,245 | 2/1977 | Scola | 264/102 |
| 4,062,917 | 12/1977 | Hill et al. | 264/102 |
| 4,180,426 | 12/1979 | Oustin | 156/104 |
| 4,283,242 | 8/1981 | Regler | 156/154 |
| 4,353,964 | 10/1982 | Grimm et al. | 264/258 |
| 4,357,193 | 11/1982 | McGann | 156/286 |
| 4,407,685 | 10/1983 | Hankland | 156/212 |
| 4,421,589 | 12/1983 | Armini | 156/382 |
| 4,504,341 | 3/1985 | Radzwill | 156/102 |
| 4,562,033 | 12/1985 | Johnson et al. | 264/510 |
| 4,622,091 | 11/1986 | Letterman | 264/510 |
| 4,652,319 | 3/1987 | Hammond | 156/94 |
| 4,681,651 | 7/1987 | Brozovic | 156/382 |
| 4,693,678 | 9/1987 | Von Volkli | 264/510 |
| 4,765,942 | 8/1988 | Christensen et al. | 264/510 |
| 4,816,106 | 3/1989 | Turris | 156/285 |
| 4,828,472 | 5/1989 | Hoh et al. | 264/40.5 |
| 4,944,822 | 7/1990 | Ishikawa | 156/212 |
| 5,013,514 | 5/1991 | Azzani et al. | 264/258 |
| 5,037,599 | 8/1991 | Olsen | 264/510 |
| 5,116,216 | 5/1992 | Cochran | 425/504 |
| 5,122,176 | 6/1992 | Goettler | 264/510 |
| 5,236,646 | 8/1993 | Cochran | 264/102 |
| 5,242,651 | 9/1993 | Brayden | 264/510 |
| 5,261,993 | 11/1993 | Dahlgren | 156/382 |
| 5,458,719 | 10/1995 | Pall et al. | 264/510 |

*Primary Examiner*—Mathieu D. Vargot

[57] ABSTRACT

A process and associated apparatus used to prepare a thermoplastic composite from a plurality of plies of thermoplastic resin prepregs. The prepregs are formed into a composite structure under two chambers; a rigid outer chamber (of any convenient size or shape) and a second flexible inner chamber containing a prepreg lay-up. The absolute pressures are reduced concurrently in a stepwise method in both chambers. This concurrent, stepped pressure reduction is accomplished at a rate which prevents the vacuum bag from moving far from the prepregs, and prevents wrinkles from forming in the prepregs. Pinching off the diffusion paths required for the removal of unwanted gases is eliminated. The lay-up is then heated and the absolute pressure in the outer rigid chamber is increased. This pressure constrains the flexible inner chamber during out-gassing of the thermoplastic resin, preventing wrinkles from forming in the prepregs. The absolute pressure in the outer rigid chamber is increased to atmospheric pressure or greater causing the prepregs to consolidate. A low absolute pressure is maintained in the flexible inner chamber. The temperature is then increased to the cure temperature of the resin and held for a time sufficient for the resin to cure. The resulting consolidated thermoplastic resin is substantially void free and detectable wrinkles are absent.

8 Claims, 10 Drawing Sheets

METHOD FOR MANUFACTURE OF MINIMUM POROSITY, WRINKLE FREE COMPOSITE PARTS

BACKGROUND OF THE INVENTION

1. Field of Invention

The present invention generally relates to a method and apparatus for manufacturing composite parts from a plurality of individual plies of thermoplastic resin, prepregs, enclosed in a vacuum bag which forms an inner chamber that is surrounded by an outer chamber, and more particularly to such a method and apparatus wherein said composite parts are manufactured with minimum porosity and essentially wrinkle free by controlling the flow of gas from the inner and outer chambers to assure that the pressure differential therebetween, if any, is kept as small as possible and the rate of change of any pressure differential between the inner and outer chambers is kept as small and as gradual as possible.

2. Description of Prior Art

Typically, shaped composite parts are made from commercial, fiber reinforced prepregs containing polymeric thermoplastic resins. During the manufacture of composite parts, a plurality of plies of fiber reinforced thermoplastic prepregs are placed on a shaped tool or mold in an uncured, pliant state. These parts are then processed using a well known vacuum bag molding technology wherein the plurality of plies on the shaped tool are covered with a flexible, porous breather material and this "lay-up" is then covered with a hermetically sealed flexible vacuum bag. The assembly is then evacuated in an effort to remove as much contaminant, such as air, water vapor, and volatile as possible. The bagged lay-up is then subjected to high temperature and/or pressure while maintaining a vacuum to cure the part. Presently autoclaves are required to apply the needed temperature and pressure to produce acceptable parts. Autoclaves are large, expensive pieces of equipment and cannot always provide void free laminates. Voids are usually caused by the inability of the resin to displace air during the time the fibers are coated with the liquid resin. Voids are also caused by air bubbles entrapped during the lay-up operation. Voids can also be caused by entrapment of air, moisture, and resin volatile at the time of consolidation. Moreover, the size, weight and cost of an autoclave prevents it from being used in field maintenance locations or smaller manufacturing facilities.

Attempts have been made to eliminate the expensive autoclave from the process. U.S. Pat. No. 4,357,193 to McGann et al. (1982) illustrates one such attempt; however, a mating rigid vacuum chamber is required to accomplish the McGann et al. process. The expense of such a vacuum chamber for each part shape makes this process very expensive. U.S. Pat. Nos. 5,116,216 (1992) and 5,236,646 (1993) to Cochran et al. disclose another attempt to eliminate the expensive autoclave process; but this process also requires the expensive concentric vacuum chamber. Although parts with adequate interlaminar shear strength yielding the desired structural integrity can be manufactured by these methods, other problems are inherent in these processes. Undesirable wrinkles in the part can make them unusable, requiring expensive remanufacture. In the manufacture of aircraft parts, for example, rejection rates of around 20% have been recorded.

Wrinkles appear in the part when a large pressure differential is used between the bag vacuum (or inner chamber vacuum) and the outer chamber vacuum. These wrinkles can be minimized only by the use of the expensive concentric chamber to limit the movement of the lay-up in these processes. A matched tool or concentric chamber is required for each and every part shape. Placing the concentric chamber over the bagged lay-up can damage the bag and/or the part due to the tight tolerance of tool to part. The rigid chamber is used to seal and restrain the bag, leading to increased labor cost. All of the above referenced patents require the use of a breather material to aid in the evacuation of the lay-up. This is an added cost in both material and labor. The process described by McGann et al uses two vacuum bags resulting in increased labor and material costs. In addition, said processes require two separate vacuum sources at additional expense.

Previous processes have failed to take advantage of the higher vacuums available from standard oil sealed vacuum pumps. Typically, as described by both McGann et al and Cochran et al , vacuums are limited from about 26 to 28 inches of mercury (in Hg) vacuum or 97 to 49 mm Hg absolute pressure. Standard oil sealed vacuum pumps can supply end vacuums of 29.9 in Hg vacuum or less than 1 mm Hg absolute pressure. These referenced processes use vacuums which do not readily remove contaminants such as water vapor and volatile at room temperatures. At room temperature, the vapor pressure of water is approximately 20 mm Hg. absolute. Volatile vapor pressures are around 5 mm Hg absolute. In order for a 28 in Hg vacuum to remove unwanted contaminants, such as water vapor and volatile, the temperature must be increased which advances the resin toward its cured state.

Normally, fiber reinforced thermoplastic resin prepregs are stored frozen in order to prevent them from advancing toward a cured state thereby increasing their shelf life. Frozen storage often causes water vapor to be trapped in the prepreg, contaminating the lay-up and lowering the interlaminar shear strength. Use of pressures less than 20 mm Hg promotes removal of this contaminant at room temperature and does not advance the resin toward its cured state. U.S. Pat. Nos. 5,116,216 and 5,236,646 both state that theoretically, it is advisable to maintain as high a vacuum as possible in the inner chamber, yet they limit vacuums to about 28 in Hg which is not sufficient to remove water vapor and most volatile at ambient temperatures. U.S. Pat. No. 4,421,589 to Armini et al (1983) and U.S. Pat. No. 4,944,589 to Ishikawa et al (1990) discuss the advantages of using process vacuums of around 1 mm Hg absolute but these references are not concerned with the production of fiber reinforced prepregs.

Autoclaves and ovens use heated gases and forced convection to provide the temperature needed to soften the resin prior to consolidation of the composite laminate. "Hotspots" can develop within the lay-up causing the resin in some areas to advance more rapidly toward cure than resin in other areas. The ideal method of heating a lay-up would be to evenly heat only the plurality of prepregs. Since it would be difficult to accomplish this goal, the best approach is to heat only the lay-up and tool. Heating elements placed under the tool was demonstrated by McGann et al but this method does not take into account the various thickness necessary in many lay-ups. Heated blankets have also been used as in Cochran et al but, again, this method does not take into account the various thickness of a lay-up.

SUMMARY OF THE INVENTION

Accordingly, several objects and advantages of the present invention include: (a) to provide a process and apparatus to produce composite laminates from fiber reinforced prepregs with the lowest possible void content; (b) to provide a process and apparatus to produce composite laminates which are essentially free of wrinkles; (c) to provide an economical apparatus and process that will produce composite laminates from fiber reinforced prepregs without the use of an expensive autoclave; (d) to provide an apparatus with integral heating of the tool, eliminating hot spots and conserving energy; (d) to provide an apparatus that is lower in cost and more portable than an autoclave; (e) to provide a simple and cost effective vacuum process which removes moisture, trapped air and volatile in the plies of prepreg; (f) to provide a process which consolidates fiber reinforced prepregs into composite laminates in the shortest possible cycle time with the lowest possible void content; (g) to provide a process which eliminates the need for expensive matched tooling (concentric chamber) of the rigid vacuum chamber, to produce composite laminates from fiber reinforced prepregs; (h) to provide an apparatus that produces void free laminate composites utilizing two independent chambers but requires only one source of vacuum; (i) to provide a process that minimizes or eliminates the need for breather materials in the production of fiber reinforced composite laminates; (j) to provide a process which can be combined with existing art such as an autoclave to produce superior composite parts; (k) to provide a process which can be readily used with a caul to produce intricately shaped composite laminates; and (l) to provide a process which minimizes resin rich or resin starved areas in the part.

These and other advantages, features and objects are achieved by the present invention which relates to the preparation of a thermoplastic-resin composite, having a low void and volatile content, and no wrinkles from a plurality of thermoplastic-resin prepregs under an absolute pressure ranging down to about 2 mm Hg and at temperatures ranging from about 120 to 800 degrees F. The prepregs are formed into a composite structure under two chambers; a rigid outer chamber (of any convenient size or shape) and a second flexible inner chamber containing the prepreg lay-up. The breather material normally used in this type process is eliminated. According to the teachings of the present invention, the absolute pressures are gradually reduced concurrently in both chambers in a stepwise manner so that the pressure differential between the inner and outer chambers is initially kept as small as possible. The absolute pressures in the inner and outer chambers are reduced at a relatively slow rate so that the rate of change of any pressure differently between the inner and outer chambers is kept as small as possible to prevent the vacuum bag from moving far from the prepregs and to further prevent wrinkles from forming in the prepregs. Pinching off the diffusion paths required for the removal of substantially all gases and volatile within the prepregs is eliminated. The absolute pressure in the inner chamber is reduced as low as possible and the lay-up is then heated at a nominal rate of about 1 to 5 degrees F/min. depending on the resin. The absolute pressure in the outer rigid chamber is increased by about 20 to 50 mm Hg to constrain the flexible inner chamber during out-gassing of the thermoplastic resin and to prevent wrinkles from forming in the prepregs. Heating is continued until the minimum resin viscosity is reached, then the resin is held at this temperature until the out-gassing of the resin is substantially complete. The absolute pressure in the outer chamber is then increased to atmospheric pressure or greater causing the prepregs to consolidate while maintaining about 2 mm Hg absolute pressure on the flexible inner chamber. The temperature is then increased to the cure temperature of the resin and held for a time sufficient for the resin to cure. The temperature is lowered to ambient at a predetermined rate. Then both chambers are vented to atmospheric pressure. The resulting consolidated thermoplastic resin is substantially void free and detectable wrinkles are absent. The flexible inner chamber conforms closely to the shape of the desired composite minimizing resin rich or resin starved areas.

Still further objects and advantages will become apparent from a consideration of the drawings and ensuing description.

BRIEF DESCRIPTION OF THE DRAWING FIGURES

This file of this patent contains at least one drawing executed in color.

DETAILED DESCRIPTION OF THE PREFERRED EMBODIMENT(S) OF THE INVENTION

Figure 1:
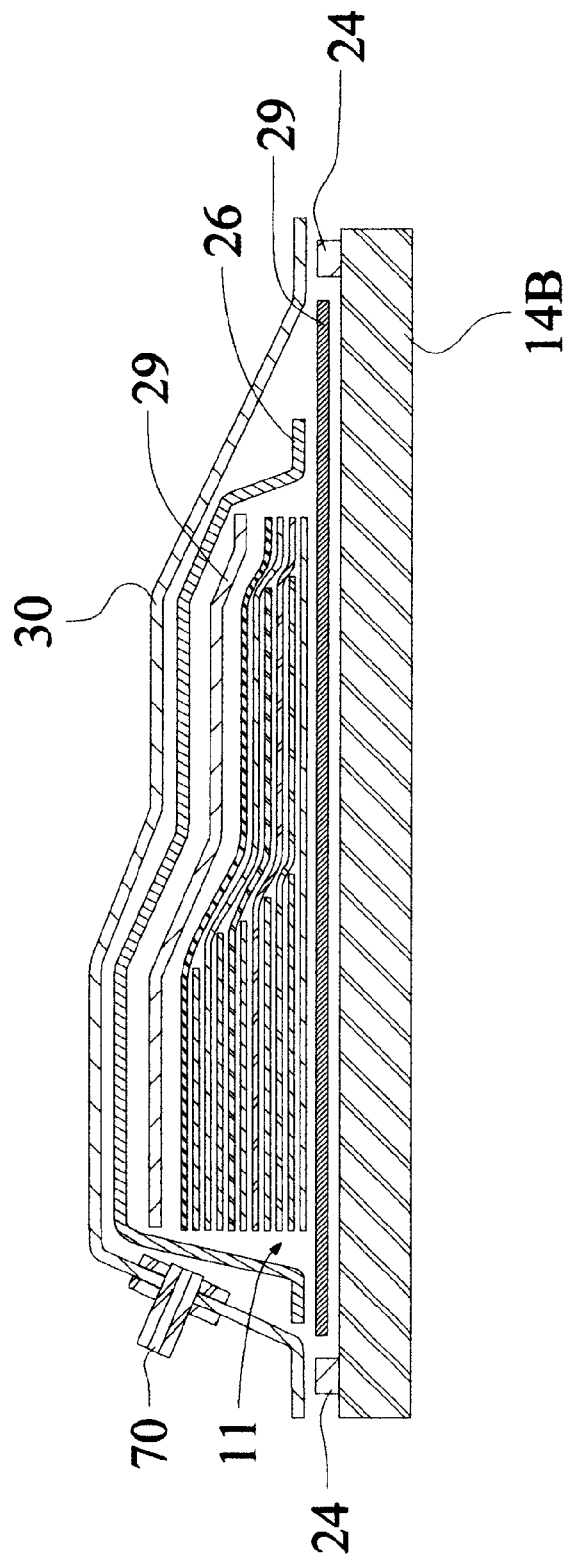
FIG. 1 is a schematic depiction of a prior art apparatus (minus the autoclave or oven) used to consolidate a plurality of prepregs.

FIG. 1 is a cross sectional schematic depiction of a prior art method of preparing thermoplastic composite laminates involving a single vacuum bag molding process and a high pressure autoclave or oven (not shown). The autoclave is a complex pressure vessel used to impart vacuum, heat, and pressure to prepregs during consolidation. Mold or tool 14B is covered with a release film 29 known in the art which prevents the composite, generally indicated at 11, from sticking to tool 14B. Composite 11, made up of a plurality of plies of prepreg which is comprised of fibers in a thermoplastic resin, is set thereon. Thermoplastic prepregs consisting of fibers in a thermoplastic resin are well known by those skilled in the art.

After the lay-up operation is completed, a second release film 29 is placed on the composite 11. Finally a breather material 26 well known in the art is placed on the lay-up. The entire assembly, made up of release film 29, composite 11, second release film 29, and breather 26, is covered by vacuum bag 30 which is sealed to tool 14B by hermetic sealant 24 and the entire assembly is placed in an autoclave or oven (not shown). A vacuum duct (not shown) is connected to vacuum port 70 and a vacuum initiated reducing the absolute pressure inside the vacuum bag 30 to about 125 to 50 mm Hg. This assembly is heated to temperature at pressures external to the bag 30 of up to about 300 psi for the length of time required to consolidate composite 11 into a finished part. As the lay-up is heated in the autoclave, the resin viscosity in the plies first decreases, then attains a minimum. During the heating process, a portion of the gases, water vapor, and volatile therein will diffuse from the resin and be removed by the vacuum source (not shown). The remaining gases, water vapor, and volatile therein will be dissolved in the resin creating voids in composite 11 reducing the interlaminar shear strength.

Alternately, composite 11 is layed-up as shown and placed in an oven (not shown) for consolidation and curing under vacuum but in the absence of the high pressure exerted external to the bagged composite 11 by an autoclave. Typically, voids in composite 11 are larger than when processed in an autoclave under high pressure, and the interlaminar shear strength is lower.

Figure 2:
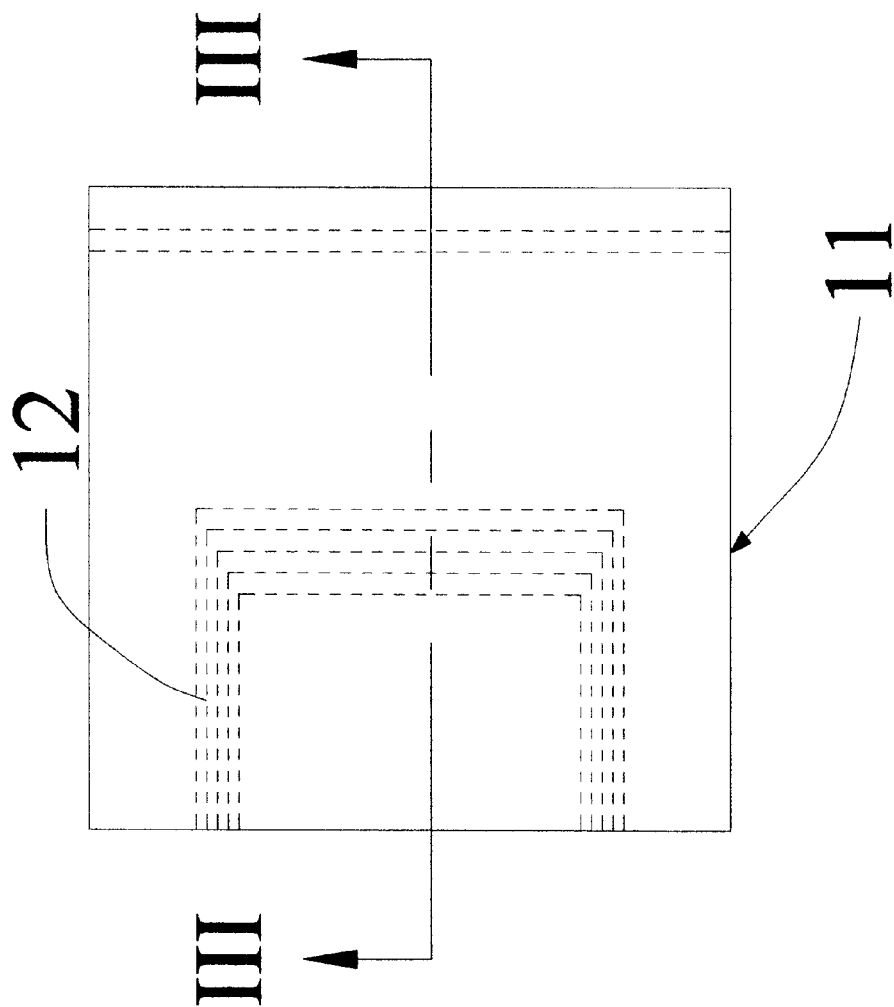
FIG. 2 is a plan view of a composite laminate prepreg lay-up consisting of, for example, eleven layers with dashed lines indicating ply drop-off locations.
Figure 3:
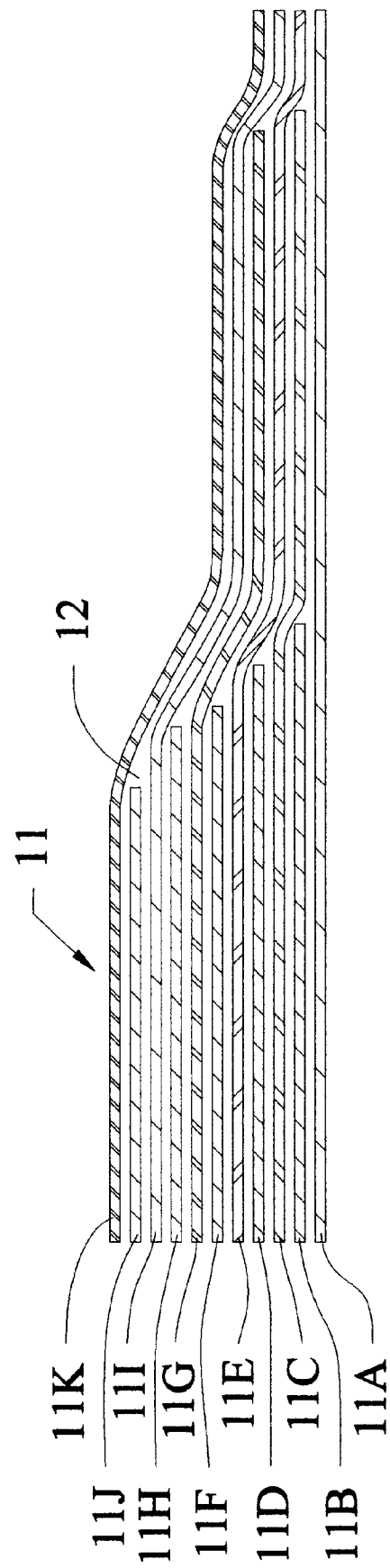
FIG. 3 is a cross sectional view taken along lines III—III of FIG. 2 of multiple plies of thermoplastic prepregs prior to processing by the present invention showing the ply drop-off areas where moisture, air and volatile are readily trapped.

FIG. 2 is a top, plan view of composite 11 formed from a multiple of plies of prepreg. This example is comprised of eleven total plies of prepreg, some being foreshortened in such a way as to create voids at ply drop-off areas 12. FIG. 3 is a cross sectional view taken along lines III—III of FIG. 2 of multiple plies 11a to 11k of thermoplastic prepregs prior to consolidation by the process of the present invention showing the ply drop-off areas 12 where moisture, air and volatile are readily trapped. Voids are also caused by the inability of the resin to displace air during the time the fibers are coated with the liquid resin.

Figure 4:
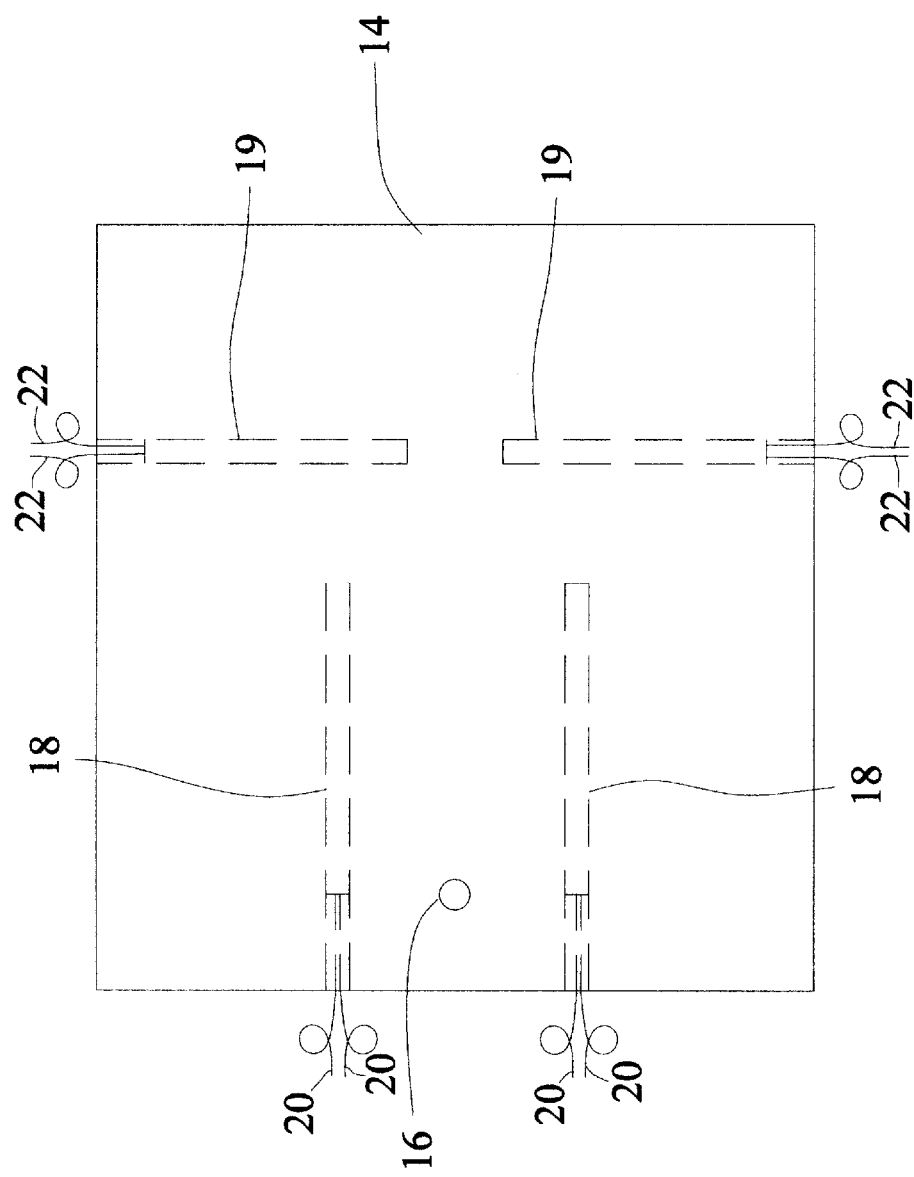
FIG. 4 is a plan view of, for example, a flat tool with integral heaters on which the thermoplastic prepreg will be positioned for processing by the present invention.

FIG. 4 is a plan view of a flat tool or mold 14 on which a thermoplastic composite part is layed-up. Tool 14 is made of ceramic, steel, or similar material. Tool 14 in this embodiment is flat but could be any three dimensional shape. Tool 14 is equipped with an internal vacuum port 16. Electric cartridge type heaters 18 and 19 are embedded within tool 14 as indicated by the hidden lines. Heaters 18 and 19 divide tool 14 into two separate heat zones due to the mass variation of the composite part to be produced. Heaters 18, in the instant embodiment are 300 watts each, and heaters 19 200 watts each. Heaters 18 and 19 are manufactured by Hotwatt Incorporated of Danvers, Mass. A more complicated tool could have multiple heat zones and any number, size or combination of heaters is possible. Other conductive or radiant heating systems could be substituted or used in combination with the preferred embodiment.

Each heat zone 18 and 19 is controlled by a Honeywell UDC 3000 Universal Digital Controller (not shown) manufactured by Honeywell of Minneapolis, Minn. Input to the Honeywell controllers is from thermocouples (not shown) positioned in selvage edges of the composite part and placed to indicate the temperature of their respective zones due to the different thickness of the part. The selvage edges are later trimmed away by methods known in the art to produce a net part. Power is supplied to the heaters 18 and 19 in response to the Honeywell controller's output by wires 20 and 22 respectively. Any of a number of heater control systems could be used to supply the required heat for bonding of the thermoplastic prepreg into the desired composite 11 part.

Figure 5:
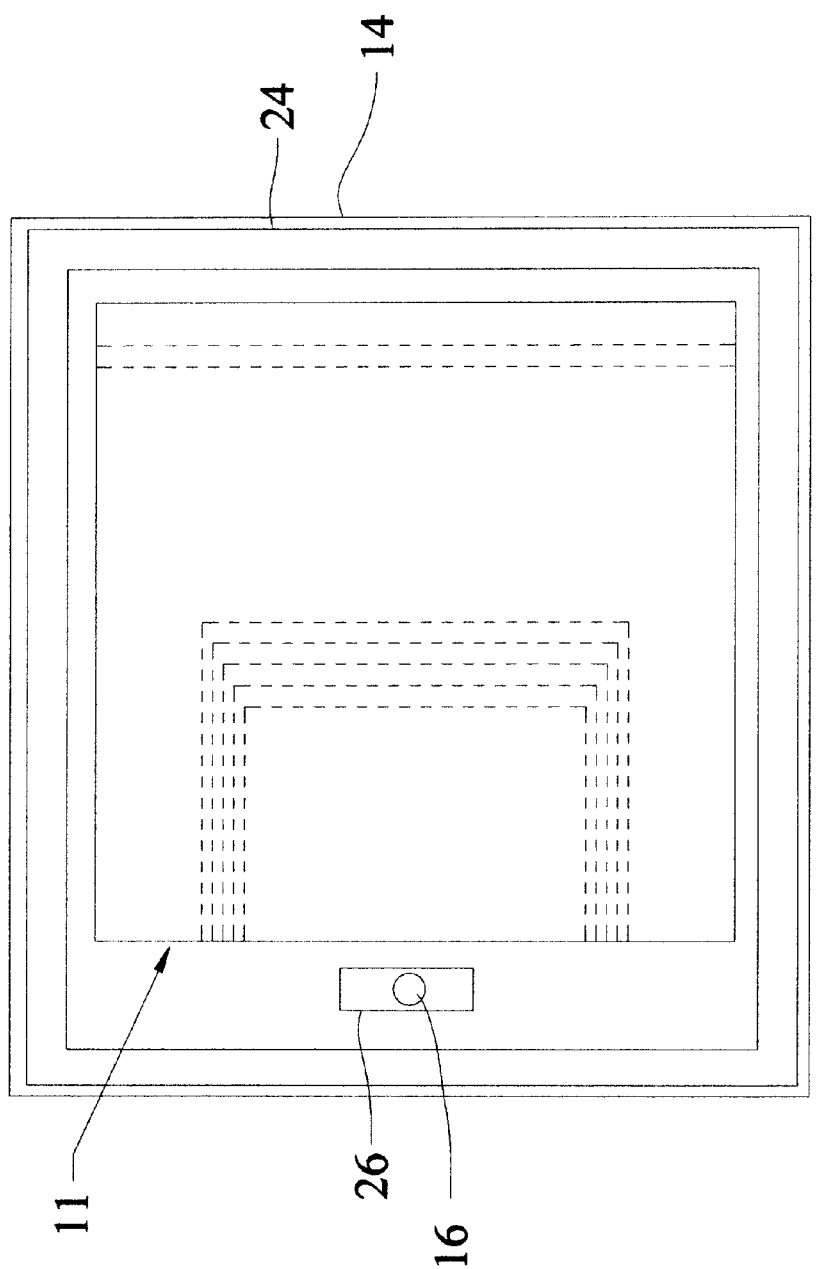
FIG. 5 is a plan view of the tool, the heaters not shown for clarity, with the lay-up of FIGS. 1 and 2 placed on the tool and indicating the bag sealant at the periphery.

FIG. 5 is a plan view of the composite 11 lay-up of FIG. 2 and FIG. 3 placed on tool 14. Tool 14 is coated with a liquid release agent (not shown), which is well known in the art, used to prevent sticking to tool 14. A plurality of plies 11a–11k, are set thereon. Plies 11a–11k are placed adjacent to one another in the desired fiber orientation angle and in the desired sequence. Plies 11a–11k can be trimmed from a prepreg roll into the desired planform shape, size, and orientation by means of a cutting device known in the art. Plies can be placed on tool 14 by hand or by machine. Vacuum port 16 is covered by breather material 26 to prevent liquid resin from entering and obstructing the vacuum port 16 during the heating process. Hermetic sealant 24 is placed around the perimeter of tool 14.

Figure 6:
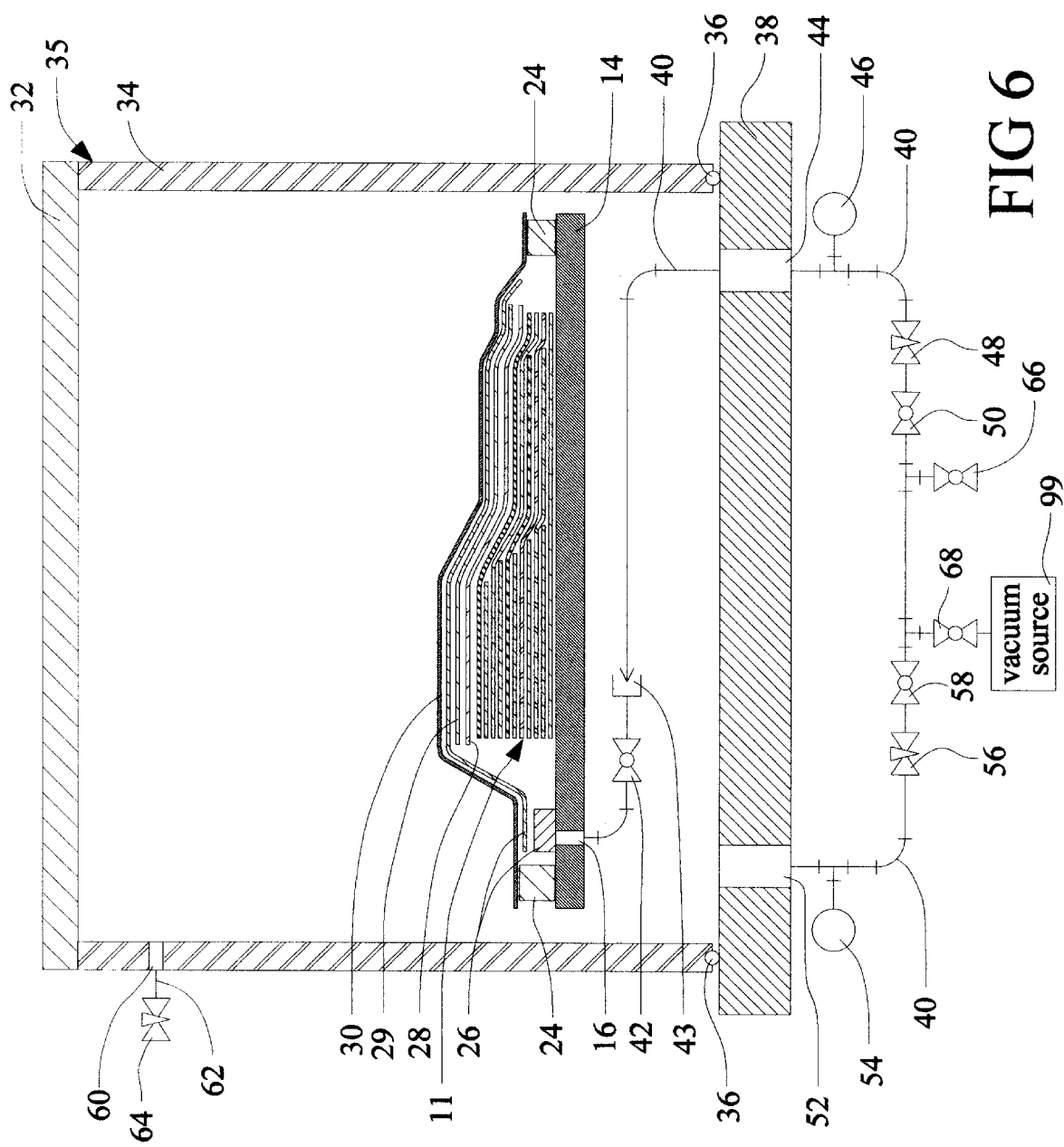
FIG. 6 is a schematic depiction of the dual chamber vacuum apparatus of this invention.

One typical embodiment of the dual chamber apparatus of the present invention is shown in FIG. 6. After the lay-up of the composite 11 is completed, a sheet of textured PTFF 28 is placed thereupon to provide a bond surface for future treatments such as paint, etc. Optionally, a caul (not shown), used to assist in holding the shape of composite 11, and/or a sheet of breather material 26 is placed over the lay-up, but the breather material is not required by the instant invention. Prior art references have required the use of breather material to assist in the removal of volatile and gases such as air and water vapor from composite 11. The present invention effectively removes these contaminants even when breather material 26 is not used. Release film 29 is then placed thereupon. This assembly of composite 11, PTFF 28, breather material 26 (if required), and release film 29 is then covered by a thin, air impervious, heat resistant vacuum bag 30 which acts as a diaphragm. The peripheral edges of vacuum bag 30 are sealed to tool 14 by hermetic sealant 24 creating an inner chamber that totally encompasses composite 11. This inner chamber assembly consisting of composite 11, PTFF 28, breather material 26 (if required), release film 29, and vacuum bag 30, which is sealingly attached to tool 14 by hermetic sealant 24, is placed on chamber base 38. Support means for tool 14, such as frame or legs, etc. is omitted for clarity. Vacuum port 16 in tool 14 is connected to vacuum source 99 by conduit 40, shutoff valve 42, disconnect mechanism 43, duct 44, flow control valve 48, and shutoff valves 50 and 68. Vent valve 66 is used to restore atmospheric pressure to this inner chamber at the end of the cure cycle. Gage 46 is used to monitor the absolute pressure of the inner chamber.

Outer rigid chamber, generally indicated at 35, is placed over the inner chamber and is hermetically sealed to the chamber base 38 by seal 36, for example, an o-ring. Outer rigid chamber 35 is an assembly of rigid chamber walls 34, transparent rigid chamber cornice 32, seal 36 and base 38. Walls 34 and base 38 are made, for example, of steel, aluminum, or similar material. A transparent rigid chamber cornice 32 made of acrylic plastic was used on the experimental chamber but is not a requirement. Outer chamber 35 can be of any convenient size or shape and is not restricted to being concentric with or matching the configuration of tool 14 as required in the prior art. Existing equipment such as autoclaves or vacuum furnaces may be used as the outer rigid chamber 35. Specialized equipment such as a vessel designed to withstand a one atmosphere pressure differential can also be utilized as the rigid outer chamber 35. The inner chamber is independent of the outer chamber with the only connection between the two being the vacuum conduit and associated parts connecting the inner chamber to a vacuum source 99. In contradistinction, prior art arrangements require the outer chamber to seal to its base with the vacuum bag interposed between the chamber and base. Vent port 60 connects into outer chamber assembly 35 through conduit 62 and flow control valve 64. Port 52 in base 38 is connected to vacuum source 99 by conduit 40, flow control valve 56, and shutoff valves 58 and 68. Gage 54 is used to monitor the absolute pressure of outer chamber assembly 35. Vacuum source 99 is typically a vacuum pump capable of producing pressures as low as 1 mm Hg.

Figure 7:
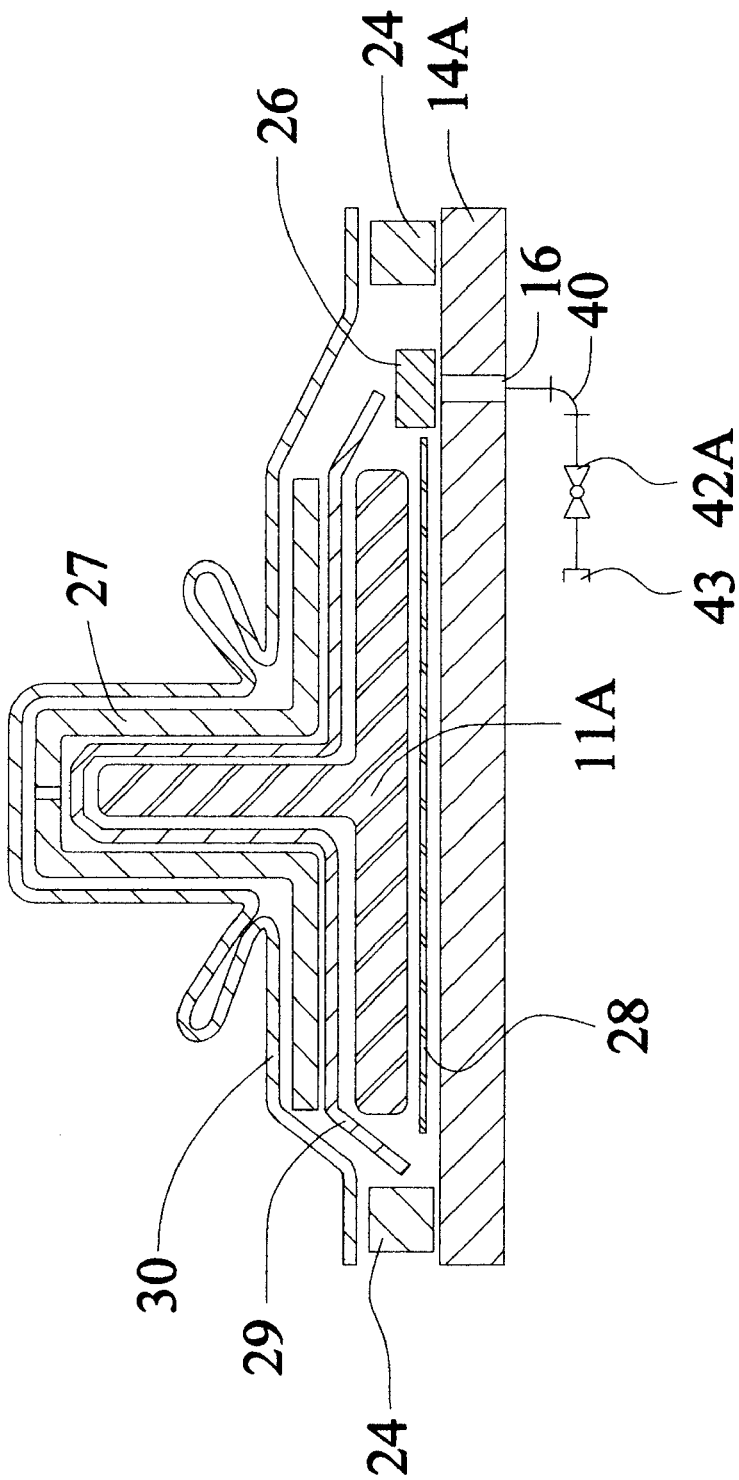
FIG. 7 is an alternate embodiment of this invention showing, for example, a method of lay-up demonstrating processing of complicated shapes in the generic chamber.

FIG. 7 is a cross sectional schematic depiction of a further embodiment of the inner chamber assembly of the present invention for use in connection with a T shaped composite 11A layed-up on tool 14A. PTFF 28 which has a textured surface is interposed between tool 14A and composite 11A. Release film 29 is placed thereupon. Optionally, caul 27 which rigidly conforms to the shape of composite 11A is placed thereupon. Vacuum port 16 is covered by breather material 26 to prevent liquid resin from entering and obstructing the vacuum port 16 during the heating process. This assembly of composite 11A, breather material 26, PTFF 28, release film 29, and caul 27, if required, is then covered by vacuum bag 30. Note the folds purposely placed in the vacuum bag 30 which are required in a T shaped lay-up. The peripheral edges of vacuum bag 30 are sealed to tool 14A by hermetic sealant 24 creating an inner chamber that totally encompasses composite 11A. This inner chamber assembly consisting of composite 11A, breather material 26, PTFF 28, release film 29, caul 27 (if required) and vacuum bag 30, which is sealingly attached to tool 14A by hermetic sealant 24 is placed on chamber base 38 as demonstrated in FIG. 6. Support means for tool 14A, such as frame or legs, etc. is omitted for clarity. Port 16 in tool 14A is connected to vacuum source 99 (as shown in FIG. 6) by conduit 40, and shutoff valve 42A, at disconnect mechanism 43. From this point forward, this embodiment is the same as discussed for FIG. 6.

Figure 8:
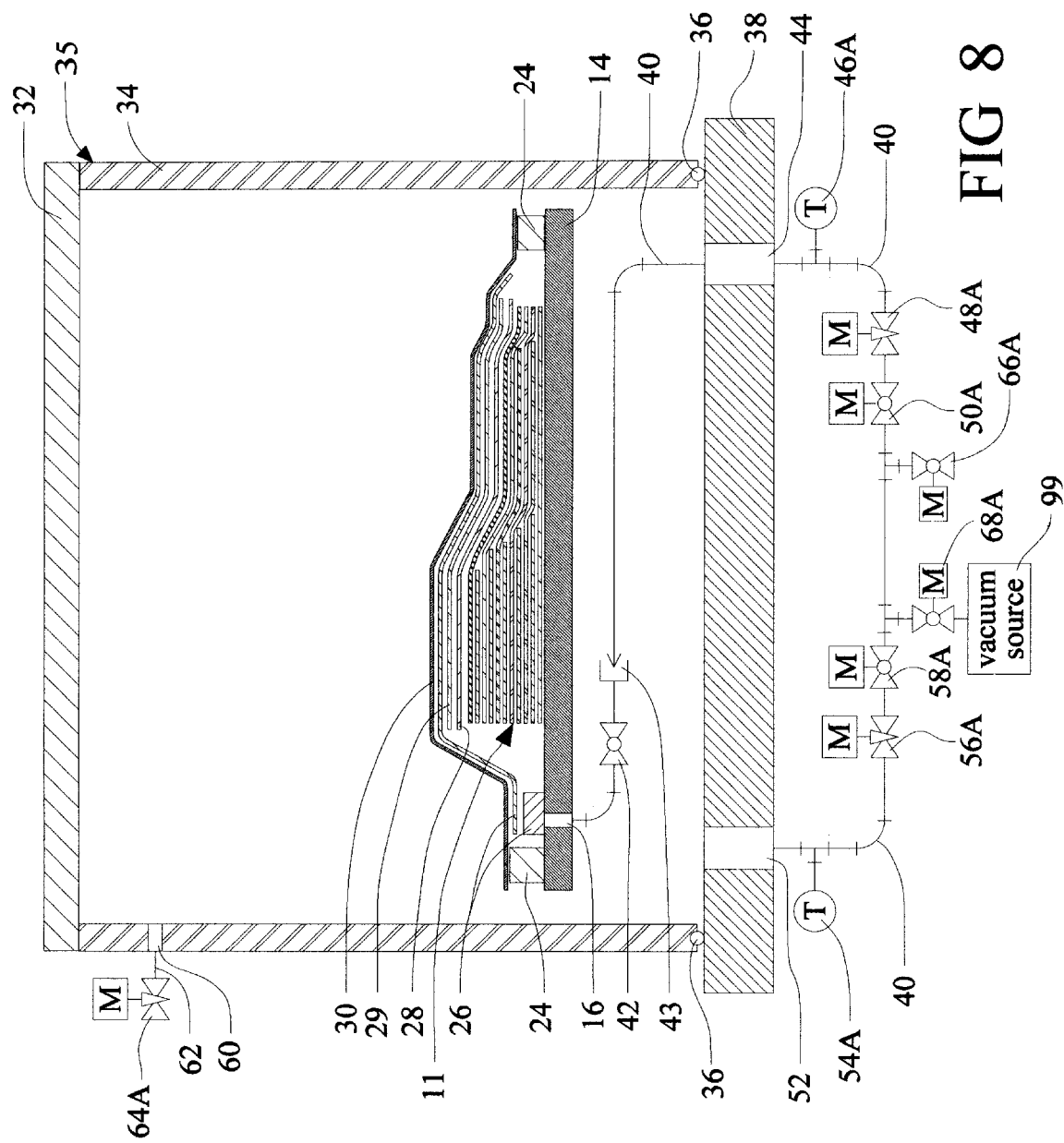
FIG. 8 is a schematic depiction of the double chamber apparatus of this invention utilizing an automatic control system.

FIG. 8 illustrates yet another embodiment of the present invention which is similar to the embodiment of FIG. 6 except that automatic valves 48A, 50A, 56A, 58A, 64A, 66A, 68A replace their respective hand operated valves 48, 50, 56, 58, 64, 66, 68 and gages 46, 54 are replaced by absolute pressure transmitting device 46A, 54A. Typically these automated valves would be operated by a computer control system (not shown) based on inputs from absolute pressure transmitting device 46A, 54A in accordance with the operation of the present invention as will be more fully described hereinbelow. Outputs to automatic valves 48A, 50A, 56A, 58A, 64A, 66A, 68A from the computer control system would control the vacuum cycle. Inputs from thermocouples (not shown) to the same computer control system control the heating zones as shown in FIG. 4. The computer control system is programmed with the proper software which is well known in the art to accurately control the curing process.

From the description above, a number of advantages of my composite laminate manufacturing process become evident: (a) the invention is carried out in a generic (of any size or shape) chamber; (b) an expensive concentric or matched tool rigid vacuum chamber is not required for proper operation of the invention as is required with prior art processes; (c) use of a generic chamber will obviate the need to carefully fit the rigid chamber over the delicate bagged lay-up as required in the prior art, eliminating the possibility of damage to the composite part and minimizing costs; (d) the invention produces composite laminates from fiber reinforced prepregs without the use of an expensive autoclave; (e) the invention is not limited by size or complexity of equipment as are existing autoclave processes; (f) specialized equipment for the invention is only required to withstand one atmosphere of pressure differential, substantially reducing the cost over the expensive autoclave. This specialized equipment may also be used to provide one atmosphere of positive pressure during the consolidation step; (g) equipment used in the present invention can be readily adapted to on site repair of aircraft etc. and to small manufacturing facilities; (h) the composite laminate can be layed-up in the conventional manner using existing tools and techniques yielding a lower cost part compared to prior art; (i) the vacuum bag is not required to be interposed between the chamber and base as required in the prior art; (j) breather materials can be reduced or eliminated reducing both labor and material costs; (k) multiple parts can be manufactured at the same time in chambers of adequate size whereas prior art processes require the rigid chamber be matched to the part being manufactured; (l) edge dams are not required for proper operation of the invention but may be necessary with some resins in order to assure a correct resin to fiber ratio, but this requirement is unknown at this time, however, placement of the edge dams in relation to the composite is not critical in this process; (m) only one vacuum bag is required whereas prior art processes require two vacuum bags, increasing both labor and material costs; (n) integral heating of the tool will eliminate uneven heating of areas of different thickness and will conserve energy; (o) only one vacuum source is required whereas prior art processes require two separate vacuum sources.

Theory Of Operation Of The Present Invention

Porosity is a persistent quality problem associated with the processing of composite parts which can result in repair or remanufacture of parts, significantly increasing costs and throughput time. Porosity in composite parts is the result of entrapped air, water vapor, and other volatile contaminant gases in cured laminates. The quality and structural integrity of a composite part starts with the raw material and is very much affected by processing factors. To obtain porosity free parts, volatile/solvent out-gassing and the removal of air and moisture should be complete before applying compaction pressure.

According to the present invention, it is preferred to maintain as high or as perfect a vacuum as possible in the inner chamber. The higher the vacuum in the inner chamber the better. Prior art has been limited to vacuums of about 28 in Hg (49 mm Hg absolute pressure). The present invention envisions the use of a standard oil sealed vacuum pump capable of producing vacuums of 29.9 in Hg (1 mm Hg absolute pressure) as are well known by those skilled in the art of oil sealed vacuum pumps.

Referring now to FIG. 6, prior to drawing a vacuum on either the inner or outer chamber, flow control valves 48 and 56 are set to permit only a small flow of gas from either chamber to assure that the pressure differential between the inner and outer chambers, if any, is kept as small as possible and the rate of change of any pressure differential between the inner and outer chambers is kept as small and as gradual as possible. This is very important for proper operation of the present invention. If the absolute pressure in the outer chamber is reduced below that of the inner chamber, the bag acts as a diaphragm and moves away from composite 11. This movement, or ballooning, will cause any tucks or folds purposely placed in the bag as part of the molding process to be pulled out of place, often ruining the part. If the rate of decrease in absolute pressure in the outer chamber is very rapid, wrinkles will appear in composite 11. Vacuum bag 30, acting as a diaphragm, instantly responds to the quick decrease in absolute pressure in the outer chamber by moving away from composite 11 and increasing the volume of the inner chamber. Due to this volume increase, the absolute pressure of the inner chamber decreases as dictated by the Ideal Gas Law. When the volume increase in the inner chamber is very rapid, the gases in the contained volume of the inner chamber will instantly fill the larger volume. This reaction can be very violent, causing undesirable wrinkles to appear in composite 11 as the expanding gases escape. On the other hand, if a vacuum is drawn on the inner chamber, decreasing the absolute pressure in the inner chamber below that of the outer chamber, vacuum bag 30 will be drawn down tightly onto the lay-up, blocking the path of gases from reaching vacuum port 16 and being ultimately expelled at vacuum source 99.

It is important to realize that the rate of absolute pressure decrease is unlikely to be the same for both the inner and outer chambers. This is due to a number of factors as discussed below.

(1) The volume of the inner and outer chambers are likely to be very different. The present invention can utilize any convenient size chamber, i.e., a generic chamber, therefore the volume of the outer chamber may be large in comparison to the relatively small volume of the inner chamber. Vacuum source 99 will displace a constant volume with each cycle, typically one rotation of its central shaft. It is obvious that a greater number of rotations of the vacuum source 99 central shaft will be necessary to reduce the absolute pressure of the larger chamber than is required to achieve the same absolute pressure in the smaller inner chamber.

(2) The conductance of the path that the gas molecules must follow prior to being excluded by the vacuum source is different between the inner and outer chambers. Conductance is defined as the throughput of the gas through any conducting element i.e. pipe, port, valve, etc. It is obvious from the diagram that the conductance would likely be different between the inner chamber and the outer chamber. According to the present invention it is important to control shutoff valves 50 and 58 so as to maintain equal absolute pressures in the inner and outer chambers, so that gas molecules have time to overcome any difference in conductance between the two chambers due to valves, conduits, etc. to insure that the absolute pressure is the same on both sides of vacuum bag 30. This concept is especially important to consider when automating the process and minimizing cycle times for improved efficiency.

(3) The temperature of the gases may be different at some portions of the cycle. It may be desirable to initiate the heating cycle as the vacuum cycle progresses. In this case, the gas molecules in the inner chamber will likely contain more energy than those in the outer chamber. This increased energy level aids in lowering the absolute pressure in the inner chamber at a faster rate.

Operation Of The Present Invention

First referring to FIG. 6, with the flow from both the inner and outer chambers gradually increased from zero by flow control valves 48 and 56 respectfully, the absolute pressure in both the inner and outer chambers can be regulated by shutoff valves 50 and 58 such that valves 50 and 58 are opened and closed sequentially to maintain essentially equal pressures on both sides of vacuum bag 30. Thus vacuum bag 30 does not move far from the surface of the lay-up nor does it achieve intimate contact with the lay-up as the absolute pressure in both the inner and outer chambers decrease at very nearly the same rate. This alternating opening and closing of shutoff valves 50 and 58 is continued until the desired absolute pressure is reached, ideally about 2 mm Hg in both the inner and outer chambers. During the operation of reducing the absolute pressure in both the inner and outer chambers, it will be noted that the rate of pressure decrease is slower with each opening and closing cycle of shutoff valves 50 and 58. This is due to the resistance to flow of valves 48 and 56 resulting in a smaller number of gas molecules reaching vacuum source 99 in a given unit of time. As the absolute pressure in the inner and outer chambers is decreased, flow control valves 48 and 56 are slowly opened in, for example, a stepwise manner, to their full open positions to regulate the gas flow to prevent wrinkling of composite 11 or excess ballooning of bag 30.

As the absolute pressure in both the inner and outer chambers is decreased to about 2 mm Hg absolute pressure by alternately opening and closing valves 50 and 58, unwanted gases such as air, water vapor, and volatile are removed by vacuum source 99 at ambient temperature. As the absolute pressure decreases below the vapor pressure of the volatile dissolved in the resin (usually about 5 mm Hg absolute), the volatile vaporizes and is available for removal by vacuum source 99. As the volatile is removed, it assists in flushing the air and water vapor from the inner chamber. Once the desired inner and outer chamber absolute pressure is reached, a dwell period assists in further removal of unwanted gases, but is not a requirement of the invention. It should also be noted that it is possible to control both the inner and outer chamber absolute pressure at a higher pressure if desired. Normally, the lower the inner chamber pressure, the lower the void content and the higher the interlaminar shear strength.

Next, composite 11 is heated at a predetermined rate depending on the resin, usually 3 to 5 degrees F./min, by the methods shown in FIG. 4. Referring now to FIG. 4 and FIG. 5. Heaters 18 are located in tool 14 adjacent to the thicker portion (11 plies) of composite 11, and the heaters 19 are located adjacent to the thinner area (6 plies) of composite 11. The heaters are sized based on the composite 11 and tool 14 heat requirement. This zoned arrangement of the heaters allows more accurate control of both the rate of temperature rise, and minimizes the deviation from setpoint. This zoned arrangement also minimizes uneven heating of composite 11. Control of the heating cycle is provided by two Honeywell UDC 3000 Universal Digital Controllers (not shown). If desired, composite 11 and tool 14 can be heated to a temperature high enough to assist in out-gassing but low enough to prevent the resin from advancing to its cured state. Heating the resin in this manner softens the resin, making it easier for unwanted gases to escape. Heating also increases molecular activity within the resin encouraging the unwanted gases to migrate toward vacuum source 99. If out-gassing is accomplished at lower temperatures, better control of the resin can be realized and resin rich or resin starved areas of the finished product can be minimized.

Again referring to FIG. 6, thermoplastic resins have different heating and curing characteristics. The resin manufacturer can supply resin Rheometric curves that characterize the resin of interest. These characteristics are well known by those skilled in the art. As the resin is heated it will decrease in viscosity, then attain a minimum. The air, water vapor, and volatile will migrate out of the prepregs and be removed by vacuum source 99. This out-gassing can become violent enough to cause wrinkles in composite 11, potentially ruining the part. To prevent this violent out-gassing, vent valve 64 is opened while shutoff valve 58 remains closed allowing the absolute pressure in the outer chamber to slowly increase by about 20 to 50 mm Hg. The desired pressure is maintained by modulating valve 58 and flow control valve 64 as required. Thus bag 30 is prevented from moving by this pressure differential, but the pressure differential is not enough to pinch off the diffusion path of the unwanted gases. Heating continues until the out-gassing of the resin is essentially complete. A dwell cycle near the minimum viscosity of the resin is beneficial in insuring complete out-gassing of composite 11. It is important that out-gassing of composite 11 be essentially complete before the resin reaches its gel time/temperature characteristic as shown by the Rheometric curves, otherwise, voids will occur in composite 11.

Next the absolute pressure in the outer chamber is increased to atmospheric or above by closing valve 58 and opening valve 64 forcing vacuum bag 30, acting as a diaphragm, to place consolidation pressure on the individual plies of composite 11 forming the void free and wrinkle free laminate. Consolidation of composite 11 must be accomplished prior to the resin reaching gel, but after substantially all out-gassing is complete. Use of a higher vacuum source (1 mm Hg absolute pressure) removes more unwanted gases at a higher rate than does the lower vacuum sources (49 mm Hg absolute pressure) of the prior art. The low absolute pressure of the inner chamber coupled with the consolidation pressure applied by the outer chamber forces the flexible inner chamber into intimate contact with composite 11. This intimate contact insures that vacuum bag 30 will be forced tightly around all corners imparting the desired shape to composite 11. This intimate contact also insures that any liquefied resin will be contained within the local area minimizing the chance that resin rich or resin poor areas will appear in composite 11. Better part definition is thus obtained on finished composite 11. Following venting of the outer chamber, composite 11 is heated to the cure temperature and held at this temperature as required to attain the desired physical characteristics while maintaining about 2 mm Hg absolute pressure on the inner chamber.

After the removal of unwanted gases and consolidation of the prepregs at the temperatures and pressures indicated herein, tool 14 and composite 11 undergo a cool-down period to allow the resin to solidify and crystallize. If necessary, a proper cool-down rate should be maintained, before releasing the vacuum in the inner chamber to atmospheric pressure, to ensure proper crystallization and avoid formation of amorphous micro-structures in semi-crystalline polymers. Next, both chambers are vented to atmospheric pressure by opening valves 64 and 66 and closing shutoff valve 68. Composite 11 formed in accordance with this invention is wrinkle free and has a lower void content yielding strength characteristics better than any of the laminates formed by a high-pressure, autoclave consolidation.

Other advantages of my minimum porosity, wrinkle free invention become apparent by referring to FIG. 7. This example is similar to the one shown in FIG. 6 except that a part with a more complicated T shape is demonstrated. An inverted T shaped composite 11A is layed-up on tool 14A in a similar manner as described in the previous example. Caul 27 is used to assist in maintaining the shape of composite 11A during the heating cycle. Typically, cauls tend to trap unwanted gases increasing the void content of the finished part causing a decrease in the interlaminar shear strength. Tool 14A and the accompanying lay-up are mounted in the chamber and connected to vacuum source 99 through disconnect mechanism 43 and with shutoff valve 42A in the open position. The removal of unwanted gases is the same as the previous example. It is obvious from FIG. 7 that a lower absolute pressure in the outer chamber than in the inner chamber will cause the folds purposely placed in vacuum bag 30 to be displaced. Such a displacement can ruin composite 1 1A requiring the part to be repaired or replaced. By maintaining an equal pressure on both sides of vacuum bag 30, these folds remain as positioned during the lay-up process insuring an acceptable part. On the other hand, if the absolute pressure in the inner chamber is lower than that of the outer chamber, vacuum bag 30 will be collapsed completely around composite 11A and caul 27 pinching off the diffusion path of the unwanted gases and increasing the void content of the part. The heating cycle is the same except that an optional heating blanket (not shown), which is well known in the art, may be placed over the lay-up and tool. The curing, consolidation, and cooling cycles are the same as for the previous example. Thus it can be seen that composite 11A formed in accordance with this invention is wrinkle free and has a lower void content when a caul is used yielding strength characteristics better than any of the laminates formed by a high-pressure, autoclave consolidation.

FIG. 8 is the similar to FIG. 6 except that automatic valves 48A, 50A, 56A, 58A, 64A, 66A, 68A replace their respective hand operated valves 48, 50, 56, 58, 64, 66, 68 and gages 46, 54 are replaced by absolute pressure transducers 46A, 54A. Typically these automated valves would be operated by a microprocessor control system (not shown) based on inputs from absolute pressure transducers 46A, 54A. Outputs to automatic valves 48A, 50A, 56A, 58A, 64A, 66A, 68A from this microprocessor control system would control the vacuum cycle. Inputs from thermocouples (not shown) to this same microprocessor control system control the heating zones as shown in FIG. 4. These automatic valves and heaters are controlled as described in the preceding examples. The microprocessor control system is programmed with the proper software to accurately control the process.

Figure 9:
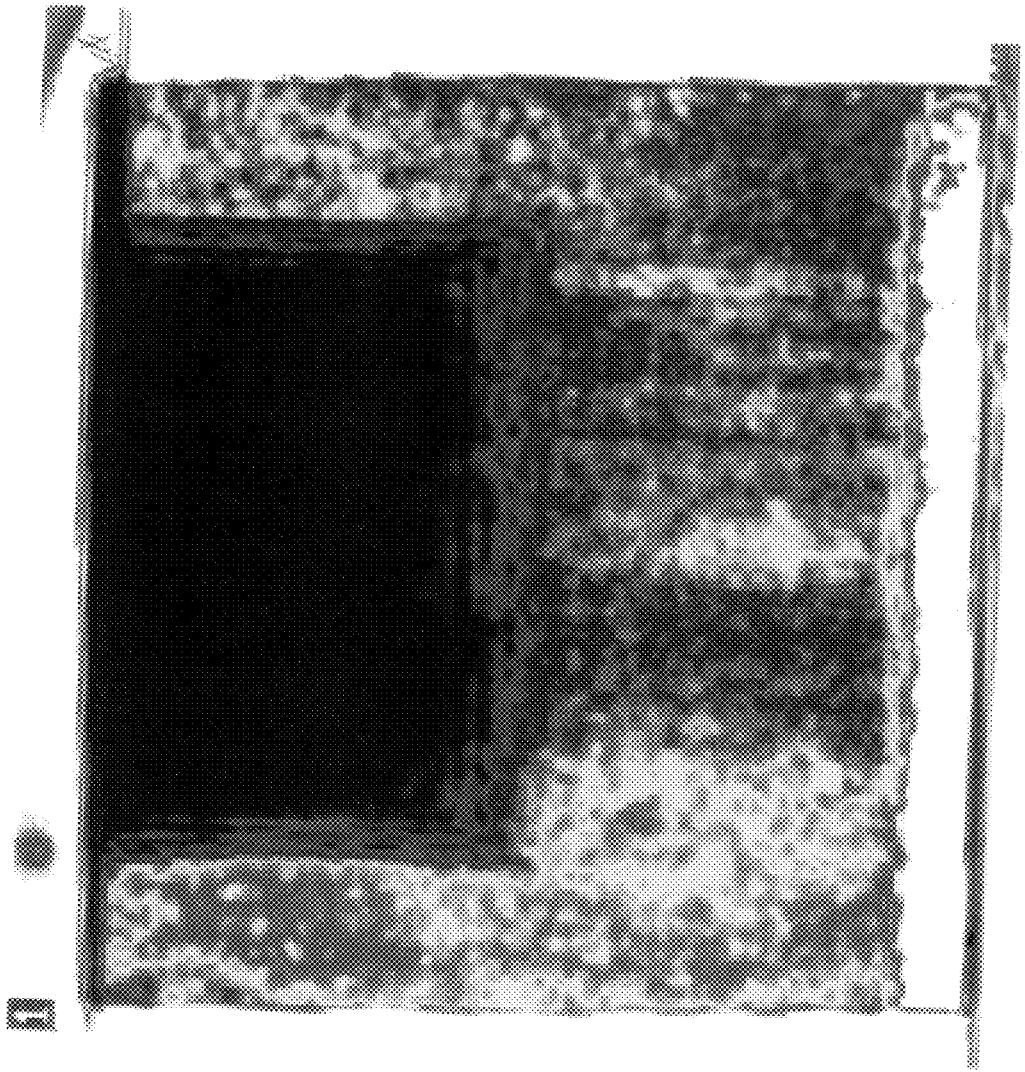
FIG. 9 is a C-scan of the composite laminate of FIG. 1 manufactured by prior art methods.

FIG. 9 is a color C-scan produced by utilizing immersed, reflected through-transmission ultrasonics with a 5 MHz transducer scanning a plurality of plies of fiber reinforced thermoplastic prepregs as described in FIG. 2 and FIG. 3 processed by prior art methods. The lighter colored areas indicate areas where the ultrasonic beam passed through the part readily at a given power setting. Lighter colored areas indicate little or no porosity or relatively thin areas of the part. Darker colored areas indicate (a) an increase in thickness making it more difficult for the ultrasonic beam to readily pass through, or (b) an increase in porosity which scatters the beam so that less ultrasonic energy is reflected back to the instrument. If identical parts are analyzed at the same gain setting, the relative porosity of the parts can be determined. The light areas of the C-scan in this figure indicate relatively thin areas (four plies), while the dark areas indicate considerable porosity.

Figure 10:
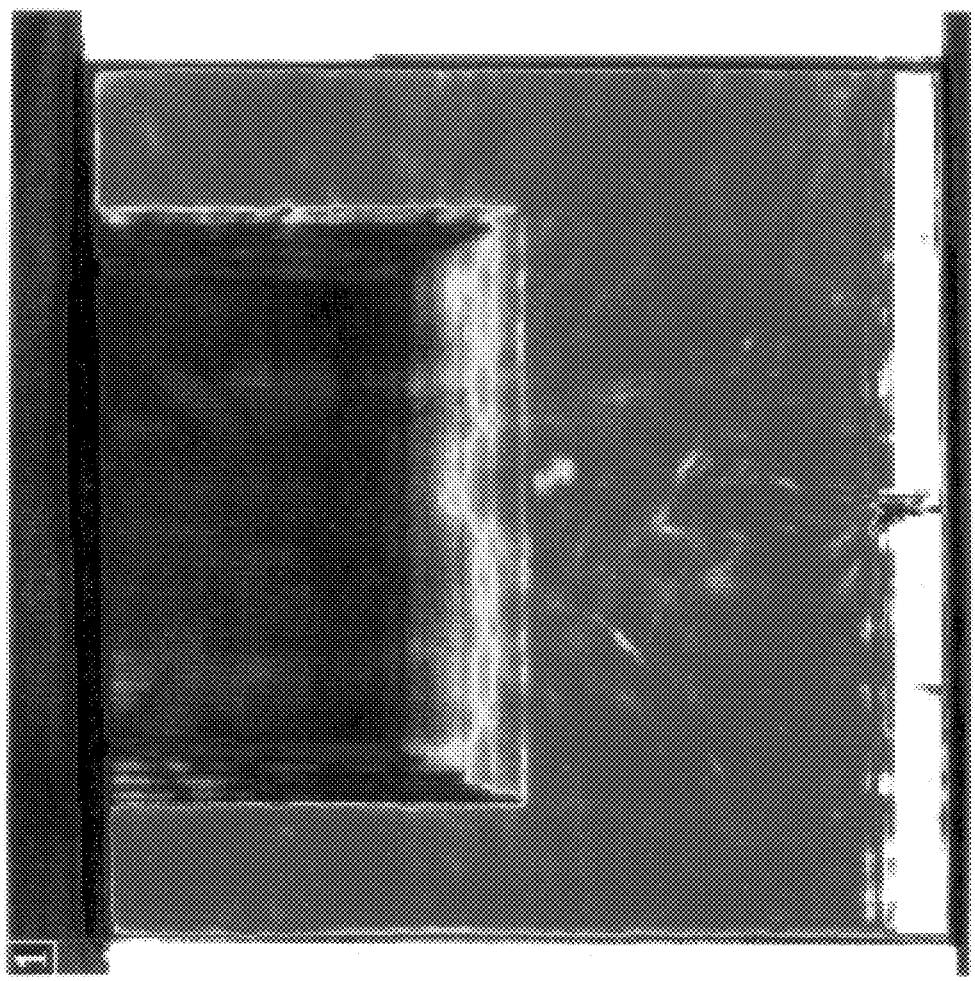
FIG. 10 is a C-scan of the composite laminate of FIG. 1 manufactured by methods of my low porosity, wrinkle free process.

FIG. 10 is a color C-scan produced by utilizing immersed, reflected through-transmission ultrasonics with a 5 MHz transducer scanning a plurality of plies of fiber reinforced thermoplastic prepregs as described in FIG. 2 and FIG. 3 processed by my composite laminate manufacturing process. The lighter colored areas indicate areas where the ultrasonic beam passed through the part readily at a given power setting. Lighter colored areas indicate little or no porosity or relatively thin areas of the part. Darker colored areas indicate (a) an increase in thickness making it more difficult for the ultrasonic beam to readily pass through, or (b) an increase in porosity which scatters the beam so that less ultrasonic energy is reflected back to the instrument. If identical parts are analyzed at the same gain setting, the relative porosity of the parts can be determined. The light areas of the C-scan in this figure indicate relatively thin areas (four plies), while the darker areas are much more uniform than the C-scan in FIG. 9 indicating substantially less porosity. The fine dark blue lines in the ply drop-off areas are probably caused by some scattering of the ultrasonic beam due to the geometry of the part. These dark blue areas would probably disappear if the ultrasonic beam was rotated so that it was normal to the geometry.

Summary, Ramifications, And Scope

Accordingly, the reader will see that the composite manufacturing process of this invention can be used to produce superior quality composite laminates from thermoplastic fiber reinforced prepregs with little porosity and wrinkle free. In addition, high quality composites can be produced without the use of an expensive autoclave and at pressures much less than the 100 to 150 psi normally required for autoclave processing. This process allows the use of any size or shape of rigid outer chamber and does not require the expensive matched tools or concentric chambers of prior art processes. Furthermore, this composite manufacturing process has the additional advantages in that:

it provides a process and apparatus to produce composite laminates from fiber reinforced prepregs with th e lowest possible void content;

it provides a process and apparatus to produce composite laminates which are essentially free of wrinkles;

it provides an apparatus that is designed to withstand one atmosphere of vacuum and is also capable of withstanding one atmosphere of internal pressure at a much lower cost than a 300 psi autoclave;

it provides an apparatus that is lighter in weight, lower in cost, and more portable than an autoclave;

it provides an apparatus in which multiple parts can be manufactured at the same time thereby reducing labor and energy costs;

it provides an apparatus that can be readily automated, minimizing cycle times and maximizing efficiency and consistency;

it provides an apparatus with integral heating of the tool, eliminating hot spots and conserving energy;

it provides a simple and cost effective vacuum process which removes more moisture, trapped air and volatile in the plies of prepreg when heated to a temperature lower than that required to advance the resin to cure;

it provides a simple and cost effective vacuum process which removes more moisture, trapped air and volatile in the plies of prepreg at ambient temperature;

it provides a simple and cost effective vacuum process which removes essentially all moisture, it provides a process which removes essentially all trapped air and volatile in the plies of prepreg as the composite is heated and advanced to cure;

it provides a process that minimizes leakage of the vacuum bag, minimizing the chance of ruining a part, because the pressure balanced process minimizes stress on the vacuum bag;

it provides a process which consolidates fiber reinforced prepregs into composite laminates in the shortest possible cycle time with the lowest possible void content;

it provides an apparatus that produces void free laminate composites utilizing two independent chambers but requires only one source of vacuum;

it provides a process that minimizes or eliminates the need for breather materials in the production of fiber reinforced composite laminates;

it provides a process that utilizes existing tools and lay-up techniques obviating special handling and minimizing labor and material costs;

it provides a process which can be combined with existing art such as an autoclave to produce superior composite parts;

it provides a process which can be readily used with a caul to produce intricately shaped composite laminates; and it provides a process which only requires one vacuum bag.

Although the description above contains many specificities, these should not be construed as limiting the scope of the invention but as merely providing illustrations of some of the presently preferred embodiments of this invention. For example:

Thick section composites can be prepared using this process.

A smaller, lighter weight version of the apparatus can be used for on site repair of aircraft, boats, automobiles, etc at remote locations.

The process can be used as a intermediate operation during the lay-up procedure utilizing low or no heat to remove air and water vapor from between the prepreg plies prior to the curing process.

The normal post-cure cycle can be shortened on some parts while achieving acceptable physical characteristics.

Alternate heating systems, such as radiation, could be used in heating of the tool and composite.

The vacuum and heating cycles can be varied to achieve specific and different results from the preferred embodiments.

The process can be used with net prepreg resin systems and other various thermoplastic and thermoset composite systems to achieve desired results.

Accordingly, the scope of the invention should be determined not by the embodiments illustrated, but by the appended claims and their legal equivalents.

I claim:

1. A process of making a substantially void-free and wrinkle-free consolidated thermoplastic-resin composite having a low void content from a plurality of prepregs impregnated with a thermoplastic resin placed on a flat or contour shaped base or mold contained in a flexible inner chamber having an absolute pressure, said inner chamber surrounded by an outer chamber having an absolute pressure, the process comprising the steps of:

(a) reducing the absolute pressure in the flexible inner chamber and the absolute pressure in the outer chamber in increments in alternating unison to about 2 mm Hg while maintaining essentially equal pressures in both the flexible inner chamber and the outer chamber; then (b) heating the plurality of prepregs to a first temperature sufficient to lower the viscosity of the thermoplastic resin; then (c) increasing the absolute pressure in the outer chamber by about 20 mm Hg to 50 mm Hg; then (d) maintaining the absolute pressure in the flexible inner chamber at said about 2 mm Hg and the plurality of prepregs at said first temperature until removal of substantially all gases, water vapor, and volatiles from the plurality of prepregs; then (e) heating said plurality of prepregs to temperatures above the melting point of the thermoplastic resin while maintaining the absolute pressure in the inner chamber at said about 2 mm Hg and said absolute pressure in said outer chamber at said about 20 mm Hg to 50 mm Hg; then (f) increasing the absolute pressure in said outer chamber to at least atmospheric pressure at a controlled rate causing an increase of pressure on said flexible inner chamber thereby causing an increased pressure on the plurality of prepregs by the flexible inner chamber while maintaining said absolute pressure of said inner chamber at said about 2 mm Hg and at said temperatures above the melting point of the thermoplastic resin for a time sufficient to consolidate the plurality of prepregs together due to the increased pressure of the flexible inner chamber on the plurality of prepregs, and then (g) lowering the temperature of said plurality of prepregs to ambient temperature and venting said flexible inner chamber and said outer chamber to atmospheric pressure to obtain said substantially void-free and wrinkle-fee consolidated thermoplastic-resin composite.

2. The process of claim 1 the step of reducing the absolute pressure in increments comprises alternately evacuating gas from the flexible inner chamber and the outer chamber at a gradually increasing rate to assure that pressure differentials between the flexible inner chamber and the outer chamber are kept as small as possible and a rate of change of the pressure differentials between the flexible inner chamber and the outer chamber is kept as small and as gradual as possible.

3. The process of claim 1 wherein step (c) further comprises constraining said flexible inner chamber to prevent wrinkles from forming in said plurality of prepregs without pinching off the diffusion paths within the composite required for the removal of substantially all said gases, water vapor, and volatiles.

4. The process of claim 1 wherein during, step (a) the flexible inner chamber, acting as a flexible diaphragm, does not move far from the surface of said plurality of prepregs thereby avoiding folds and pleats in said flexible inner chamber, purposely placed in said flexible inner chamber, from being displaced by forces created by a differential pressure acting on said flexible diaphragm.

5. The process of claim 1 wherein said first temperature is high enough to lower the viscosity of the thermoplastic resin but below a temperature which will advance the thermoplastic resin to cure.

6. The process of claim 1 wherein said step of increasing the absolute pressure in the outer chamber comprises increasing the pressure to about two atmospheres thereby minimizing any remaining voids.

7. The process of claim 1 wherein a metal, plastic, or composite plate or caul having a shape as the composite shape is placed upon said plurality of prepregs prior to said step of reducing the absolute pressure in the inner and outer chambers.

8. The process of claim 1 wherein during said consolidation, said flexible inner chamber is compelled into intimate contact with the plurality of prepregs and resin rich and resin starved areas are therefore minimized.

* * * * *